Patented Sept. 26, 1950

2,523,623

UNITED STATES PATENT OFFICE 2,523,623

RESINS FROM CASHEW NUT SHELL LIQUID

Mortimer T. Harvey, South Orange, N. J., and Solomon Caplan, New York, N. Y., assignors to The Harvel Corporation, a corporation of New Jersey No Drawing. Application May 1, 1946, Serial No. 666,522

4 Claims. (Cl. 260—45)

This invention relates to novel compositions of matter and to methods for preparing the same. In one of its specific aspects this invention relates to novel methods and products produced with aniline, an aldehyde and various anacardic materials and derivatives thereof. While any aldehyde or combination of aldehydes may be employed in the practice of this invention, illustrative examples thereof are formaldehyde, glyoxal, furfuraldehyde, acetaldehyde, aldol, crotonaldehyde, acrolein, benzaldehyde and the like. These aldehydes may be used in their reactive monomeric state and when available in their reactive polymeric state. The anacardic materials and derivatives thereof includes cashew nut shell liquid, distillates of cashew nut shell liquid, residues of cashew nut shell liquid which may be in either the monomeric or fusible or reactive polymeric states, as well as hydrogenated cashew nut shell liquid, hydrogenated distillates of cashew nut shell liquid and hydrogenated residues of cashew nut shell liquid produced by completely saturating with hydrogen only the unsaturated hydrocarbon substituents normally present in cashew nut shell liquid, said distillates and residues.

The cashew nut shell liquid may be the raw cashew nut shell liquid obtained by the solvent extraction of said liquid from the cashew nuts or by the extraction of said liquid from said nuts by the use of a hot cashew nut shell liquid bath as set forth in the U. S. Patent to E. R. Hughes, No. 2,058,456 of October 27, 1936, or it may be the so-called treated cashew nut shell liquid obtained after the raw cashew nut shell liquid has been treated to reduce its vesicant action and to remove the naturally occurring metals therein as set forth in the patent to Harvey-Damitz, No. 2,067,919 of January 19, 1937 and to Harvey-Damitz, No. 2,128,247 of August 30, 1938 to which reference is hereby made, or it may be either the raw or treated cashew nut shell liquid which has been distilled or distilled under vacuum at about 500° F.–600° F. to remove the more volatile constituents which measure about 5% by weight of the liquid treated.

The distillates and residues from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled preferably at between 600° F.–700° F. or distilled under sub-atmospheric pressure conditions and preferably below about 50 mm. of mercury pressure and temperatures between about 400° F.–700° F. When distilled under reduced pressure of about 50 mm. of mercury we prefer to employ temperatures between about 525° F. and 700° F. and when distilled under reduced pressure of about 10 mm. of mercury we prefer to employ a temperature of about 450° F. By whatever method employed, the distillation is continued until the quantity by weight of the distillate is between about 25% to about 75% of the quantity by weight of the cashew nut shell liquid and the quantity by weight of the residue is between about 25% to about 75% of the quantity by weight of the cashew nut shell liquid. The distillates thus obtained for the most part consist of a phenol having an unsaturated hydrocarbon substituent having more than 13 carbon atoms and having a boiling point of approximately 225° C. at 10 mm. of mercury pressure. Of these distillates we prefer to employ those produced by vacuum distillation, thus eliminating the use of steam or the like. These distillates consist chiefly of a phenol having an unsaturated side chain hydrocarbon substituent containing 15 carbon atoms, with said unsaturation being due to one or more ethylenic linkages. This product has the following general formula:

with X being a straight chain unsaturated hydrocarbon substituent whose unsaturation is due solely to ethylenic linkage.

The polymerized cashew nut shell liquid may be prepared by whatever method is desired but for purposes of illustration reference is hereby made to the Harvey et al. Patents No. 2,238,247 of August 30, 1938 and 2,240,038 of April 29, 1941. The distillates and the residues may be polymerized in any desired manner and for purposes of illustration reference is made to the patents to S. Caplan, No. 2,292,611 of August 11, 1942 and 2,317,585 of April 27, 1943. By following the teachings of said patents we may prepare fusible polymers of said anacardic materials and said polymers may be used in the manner set forth herein.

The cashew nut shell liquid, said distillates and said residues may be hydrogenated in order to completely saturate with hydrogen only the unsaturated hydrocarbon substituents normally present therein. This may be done by bubbling hydrogen in one of said products having admixed a hydrogen catalyst such as palladium or platinum black. These various hydrogenated products may be produced in the manner set forth in the U. S. patent to S. Caplan No. 2,181,119 of November 28, 1939.

In carrying out this invention improved products may be obtained by employing together the separate components of aniline, one or more aldehydes and one or a combination of two or more of said anacardic materials and/or said derivatives. Instead of following this procedure, one or more of said anacardic materials and/or derivatives may first be reacted with one or more of said aldehydes to provide a fusible or reactive resinuous composition which is then combined with aniline. Another alternative is to combine one or more of said anacardic materials and/or derivatives with a reactive resinous organic reaction product of aniline and one or more of said aldehydes. Still another alternative is to react one or more aldehydes with aniline and combine this reactive reaction product with a fusible resinous condensation reaction product of one or more aldehydes with one or more of said anacardic materials and/or derivatives.

The fusible resinous compositions of one or more of the anacardic materials or derivatives and one or more of the aldehydes may be produced by reacting the former with the latter, preferably in the presence of a condensing agent to promote the reaction. The ratio by weight of the reactants may vary over wide ranges and is preferably between about 3 to 1 and 1 to 3. The condensing agent may be either acidic or alkaline. The reaction is produced by boiling the mixture of reactants and condensing agent until the resinous condensation is produced. These various condensation products are hereinafter known as product A.

Aniline may be reacted with one or more of said aldehydes in a wide range of molecular proportions and under acidic, neutral or alkaline conditions to provide aniline-aldehyde resinous condensation products. These various products will hereinafter be known as product B.

The following Examples B-1 and B-2 are set forth merely as illustrative methods for producing aniline-aldehyde resinous condensation products.

Example B-1

Into a glass vessel are placed 500 grams of water, 100 grams of aniline and 100 cc. of concentrated hydrochloric acid (37%) resulting in a clear solution. To this clear solution is slowly added 95 cc. of an aqueous solution of formaldehyde (concentration 37.5%). This mixture is heated slowly until its temperature reaches 50° C. to 55° C. Then the source of heat is removed and the mass is allowed to stand for one hour. Dilute NaOH is added to the reaction mass whereupon the reaction product precipitates out. The mass is filtered and the precipitate is recovered, broken up in a slurry in water and refiltered to remove any water soluble adhering salts. The washed precipitate is then spread out and dried at room temperature. After it is dried it may be ground to a fine powder and either in the powder or lumpy consistency is known as product B-1. By substituting furfuraldehyde for the formaldehyde above in the same proportions, the aniline-furfuraldehyde resin produced is known as B-1F.

Example B-2

Into a glass vessel are placed 80 cc. of an aqueous solution of formaldehyde (concentration 37.5%). Then there is slowly added thereto 100 grams of aniline. After the last increment of aniline is added, the mass is allowed to stand for one hour. Then the mass is filtered and the solid reaction mass is recovered and dried at room temperature and is known as product B-2. By substituting furfuraldehyde for the formaldehyde above in the same proportion, the aniline-furfuraldehyde resin produced is known as B-2F.

We have discovered that resinous aniline-aldehyde reaction products may be dissolved in one or more of said anacardic materials and/or derivatives thereof and then cured to provide products whose "fiber," tensile strength and toughness are much superior to those of the resinous aniline-aldehyde reaction products per se, and said novel products are thermosetting resins. In this particular aspect we are able to produce novel thermosetting compositions and the percentage of resinous aniline-aldehyde component present determines to some degree the characteristics of the final product.

The various products made in accordance with this invention find use in a wide variety of different fields. The fusible thermosetting products find especial application in the coating field where the electrical and solvent-resistant characteristics are of particular importance. They also find application in the molding field as well as in the rubber field. They have been found particularly useful as laminating media for paper, cloth, metal, wood and the like. They may also be employed in the field of friction elements such as in brake linings, clutch facings and the like and also in the grinding field as binders in the production of grinding wheels.

Friction elements, such as brake linings and clutch facings, consist essentially of a woven or matted fibrous material, such as asbestos, in combination with a friction fortifying material and a binder, such as rubber, a phenol-aldehyde resin or the like. Various friction fortifying materials have been employed in said combination and when so employed, said materials have been in a finely comminuted state. The comminuted particles of said friction fortifying materials with which this invention is primarily concerned are those of such particle size that at least 90% of the particles pass through a 20 mesh screen and at least 70% of the particles which pass through said 20 mesh screen are retained on a 100 mesh screen. This invention, in one of its aspects, is concerned with friction fortifying materials consisting of aldehyde-organic condensation products which are thermosetting resins because it has been found that these friction fortifying materials when comminuted and packed for shipment, sometimes cause fires due to spontaneous combustion.

Some of these various compositions are the infusible solids produced by polymerizing cashew nut shell liquid, the distillates of cashew nut shell liquid as well as the residues of cashew nut shell liquid either alone or in combination with each other and also are the infusible aldehyde reaction products of cashew nut shell liquid, one of said distillates or said residues, or they are preferably the aldehyde reaction products of fusible polymers of cashew nut shell liquid, one of said distillates or one of said residues. In order that the spontaneous combustion characteristic of any of said various compositions and particularly the aldehyde-polymer condensation products may be considerably reduced, we have found that the addition of a small amount of aniline or of a soluble aniline-aldehyde reaction product thereto serves said purpose. The quantity of aniline or soluble aniline-aldehyde resinous reaction product sufficient to greatly reduce if not completely eliminate the spontaneous combustion characteristic of these compositions in plant operation may be as low as 0.1 of 1%. For this purpose we prefer that the ratio of aniline or soluble aniline-aldehyde resinous reaction product to these various compositions be in the ratio by weight of about 1 to 1000 and 1 to 100 although the ratio of aniline or aniline-aldehyde product to these various compositions by weight may be as high as 1 to 3.

One of the specific products with which this invention is primarily concerned is a liquid polymer of cashew nut shell liquid polymerized to such a degree by heating in the presence of a polymerizing agent that a solution thereof with an equal weight of xylene has a viscosity at 25° C. of between 40-300 C. P. Such a product will hereinafter be known as product C. Product C may be produced in a manner specifically described in the patent to S. Caplan et al, No. 2,338,230 of January 4, 1944.

We have also discovered that aniline may be readily dissolved in any one of the various anacardic materials without first being dissolved in alcohol or water, which solvents have heretofore been neccessary when NaOH or the like was employed for changing the setting time of these various materials when alone or in combination with an aldehyde reactant.

Comminuted friction materials may be produced by following the general method set forth in the following Examples 1 to 4 and generally consist in reacting one of said polymers known as product C with one or more of said aldehydes to produce a resinous composition to which is added aniline or an aldehyde-aniline resinous reaction product. Then the mass is cured to the solid infusible state and subsequently comminuted. The tendency of said comminuted material to spontaneous flash into flame in the course of handling or storing is considerably reduced.

Example 1

To 4500 lbs. of product C is added 5 lbs. of aniline while product C is cooling. The aniline is uniformly distributed therethrough then this mixture is placed in a dough mixer to which is added 10 lbs. of paraformaldehyde, 1½ lbs. furfuraldehyde, which aldehydes are uniformly distributed throughout the mixture. The resultant mix is removed from said mixer, poured into pans and allowed to cure for a period of 16 to 24 hours at 260-275° F. The resultant product is a solid infusible mass which is now ground in a hammer mill to approximately 20 to 40 mesh size and is particularly suitable as a frictional fortifying agent in the manufacture of brake linings, clutch facings, grinding wheels and the like.

Example 2

150 lbs. of polymerized cashew nut shell liquid known as product C is placed in a dough mixer then there is added thereto 10 lbs. of paraformaldehyde and 5 lbs. of furfuraldehyde together with 2½ lbs. of the aniline-formaldehyde resin known as product B-1. This combination is mixed until the various components are uniformly distributed with respect to each other. Then the mix is poured into shallow pans and cured for 16 to 24 hours at 260-175° F. whereupon a solid infusible mass is obtained. This solid material is ground in a hammer mill to approximately 20 to 40 mesh size and finds the same uses as the materials set forth in Example 1.

Example 3

The components, procedure and uses are the same as those set forth in Example 2 with the exception being that 4 lbs. of the aniline-aldehyde reaction product known as product B-2 is substituted for the 2½ lbs. of product B-1.

Example 4

500 gr. of water and 100 gr. of aniline are mixed together and then there is added thereto 100 cc. of hydrochloric acid (37½%). This mixture is stirred to provide a clear homogeneous solution. Then to said solution is added 100 gr. of polymerized cashew nut shell liquid known as product C. The mix is continuously stirred while 115 cc. of water solution of formaldehyde (37½%) is added thereto. In the course of this last addition the temperature of the mass rises and reaches approximately 65° C. where it is maintained while the mass is constantly stirred for an additional hour. Then a dilute aqueous solution of an alkali such as sodium hydroxide is slowly added to said mix which causes a precipitation. The mix is filtered and the precipitate is recovered and broken up into a slurry with several volumes of water. This slurry is filtered and the precipitate is substantially dried at room temperature. The dry precipitate is pulverized in a hammer mill and may then be combined with asbestos with or without a binder and this mass is pressed and cured at about 320° F. for ½ hour and further cured in an open oven at approximately the same temperature for 16 to 24 hours.

The following Examples 5 to 7 inclusive disclose other methods for providing other compositions for use particularly in fields other than the brake lining field.

Example 5

Into a 1000 cc. beaker were placed 500 gr. of water and 93 gr. of aniline which was held in suspension by rapid stirring. Then to said suspension was slowly added 58 gr. of acrolein while the mass was continuously stirred. Stirring was continued for a period of approximately 1 hour thereafter and then the mass was allowed to stand overnight. The next morning the mix was found to have separated into two main layers: a supernatent aqueous layer and a resinous layer. The aqueous layer was poured off and the resin was heated to approximately 130° C. to remove substantially all of the water therefrom. The dry resin measured about 130 gr., did not cure well when in ¼" thickness at 100° C. for 16 hours but in a thin film on glass it turns brownish in color and sets to a hard somewhat crystalline coating. To 37½ gr. of this resin is added 12½ gr. of product D. Product D may be produced by heating at a temperature between about 200-230° F. a mixture of one of said distillates of cashew nut shell liquid, formaldehyde and a condensing agent, with the ratio of the distillate to formaldehyde by weight being approximately 3 to 1 and the condensing agent preferably being ammonia. The resultant resinous composition is known as product D. Then to said mixture of said resin and product D is added 50 gr. of xylol and the entire mass is agitated until a substantially clear solution is obtained. When this solution is placed in a thin film on glass and maintained at 200° F. for a period of about 35 minutes, it is converted to a somewhat dry, tough film having high resistance to water, oils, alkalis and various other well-known common solvents. This solution finds particular application as a coating medium on paper, metal, wood and the like and may be cured in an oven at a temperature between 200–300° F. to provide a somewhat hard, tough protective film.

*Example 6*

75 gr. of aniline, 25 gr. of a hydrogenated distillate of cashew nut shell liquid with the normally present unsaturated side chain thereof being completely saturated with hydrogen, 100 gr. of tetrahydrofurfuryl alcohol and 100 gr. of furfuraldehyde are mixed together and heated to boiling whereupon the external source of heat is removed and the reaction is allowed to continue for about 10 to 15 minutes thereafter. In the course of this reaction water of reaction is produced and heating is continued for an extra ½ hour. The water may be removed therefrom and the clear resultant solution may be cured by maintaining the same at a temperature between 250–300° F. for a period of ½ to 16 hours depending upon the quantity of the product being cured as well as the temperature employed. The resultant cured product is a tough dark film. The novel solution finds especial application as a coating material for wood, paper, glass, metal and so forth.

*Example 7*

100 gr. of polymerized cashew nut shell liquid known as product C, 100 gr. of aniline and 130 cc. of an aqueous solution of formaldehyde (37.5%) are mixed together and allowed to react exothermically for one hour. Then the resultant mass is washed with water and heated to 300° F. in an open container in order to dehydrate and thicken the same. This mass which is now in a thick yet pourable condition is thinned with a solvent such as petroleum spirits, xylol or the like, may be used as a coating material for wood, paper, metal and the like. The temperature of curing may be between 275–300° F. If desired there may be added to said solution a small quantity of an alkaline material such as hexamethylene tetramine which improves the curing thereof.

Having thus described the invention, what is claimed and is to be protected by Letters Patent is:

1. The method comprising mixing aniline, an aldehyde, and polymeric cashew nut shell liquid polymerized to such a degree by heat in the presence of an acidic polymerizing agent that a solution thereof in an equal weight of xylene has a viscosity at 25° C. of 40–300 centipoises, the ratio by weight of said aniline to said polymeric cashew nut shell liquid being in the range of 1–1000 to 1–100, heat curing said mixture to the solid state, and comminuting said solid.

2. The method comprising mixing aniline, formaldehyde, and polymeric cashew nut shell liquid polymerized to such a degree by heat in the presence of an acidic polymerizing agent that a solution thereof in an equal weight of xylene has a viscosity at 25° C. of 40–300 centipoises, the ratio by weight of said aniline to said polymeric cashew nut shell liquid being in the range of 1–1000 to 1–100, heat curing said mixture to the solid state, and comminuting said solid.

3. A product made by the method of claim 1.

4. A product made by the method of claim 2.

MORTIMER T. HARVEY.
SOLOMON CAPLAN.

REFERENCES CITED

The following references are of record in the file of this patent:

UNITED STATES PATENTS

| Number | Name | Date |
|---|---|---|
| 2,253,088 | Novotny et al. | Aug. 19, 1941 |
| 2,306,077 | Novotny et al. | Dec. 22, 1942 |
| 2,338,231 | Caplan et al. | Jan. 4, 1944 |
| 2,340,036 | Zimmer et al. | Jan. 25, 1944 |